(No Model.) 7 Sheets—Sheet 1.

A. J. BATES.
ENGINE.

No. 436,768. Patented Sept. 23, 1890.

Witnesses.

Inventor
Albert J. Bates By
Thos. H. Hutchins his atty (No Model.) 7 Sheets—Sheet 3.

A. J. BATES.
ENGINE.

No. 436,768. Patented Sept. 23, 1890.

Witnesses.
A. F. Cagwin
L. D. Stearns

Inventor
Albert J. Bates By
Thos. H. Hutchins his atty (No Model.) 7 Sheets—Sheet 4.
A. J. BATES.
ENGINE.
No. 436,768. Patented Sept. 23, 1890.
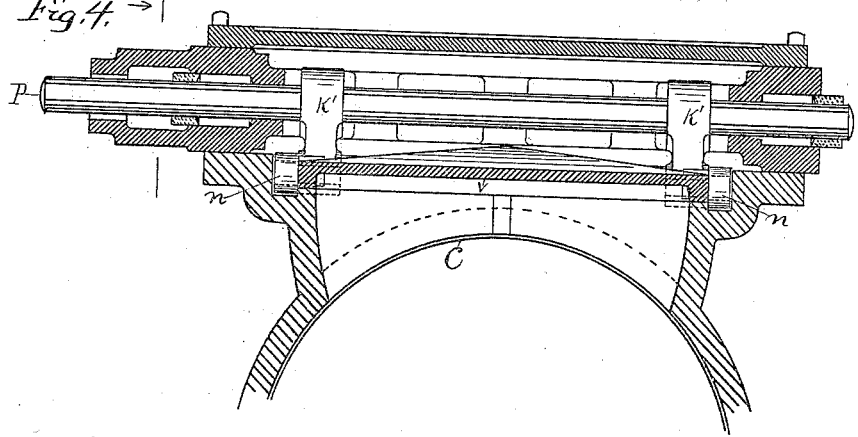
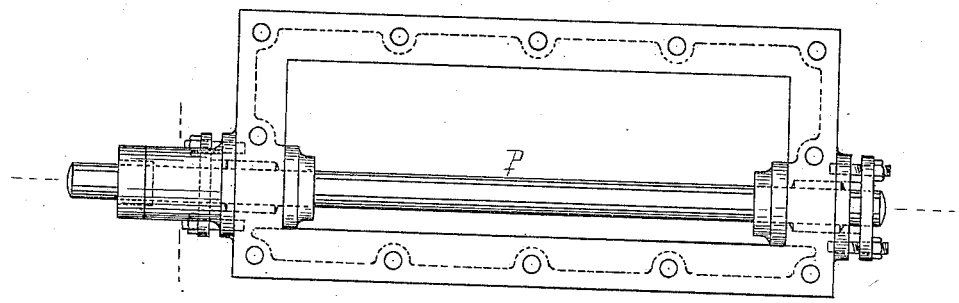
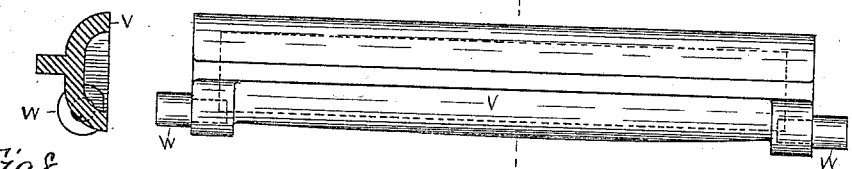
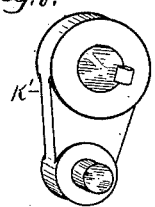 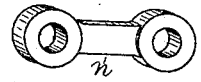 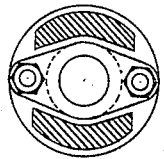 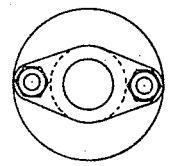
Witnesses.
A.F.Hagwin
L. D. Stearns
Inventor
Albert J. Bates By
Thos H Hutchins his atty (No Model.) 7 Sheets—Sheet 5.
A. J. BATES.
ENGINE.
No. 436,768. Patented Sept. 23, 1890.
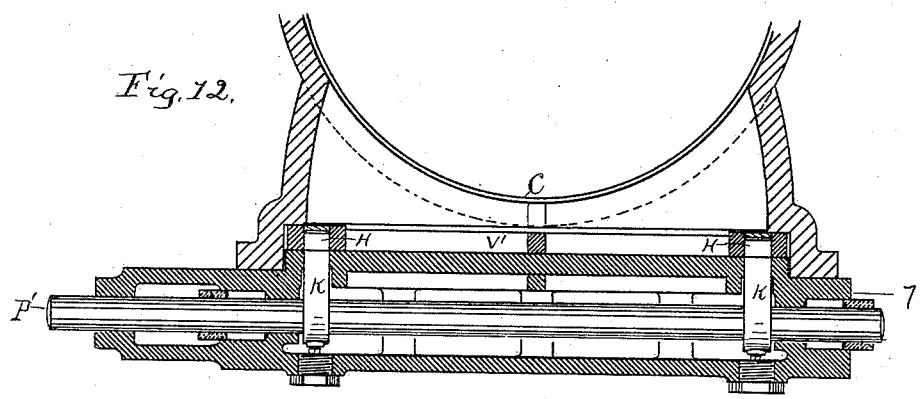
Fig. 12.
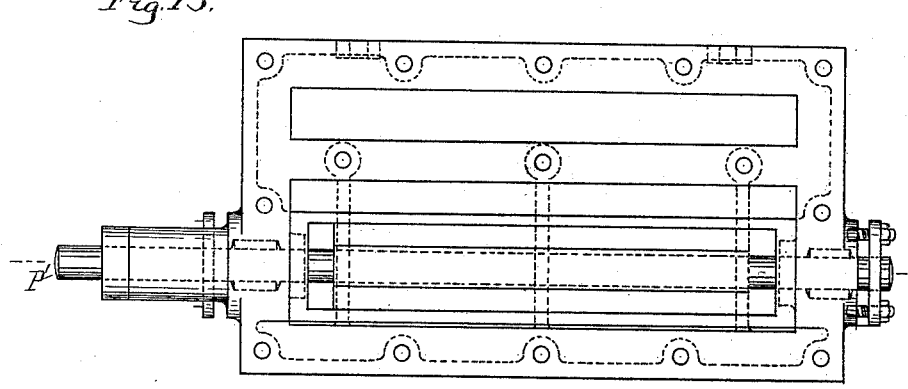
Fig. 13.
Fig. 15. Fig. 14.
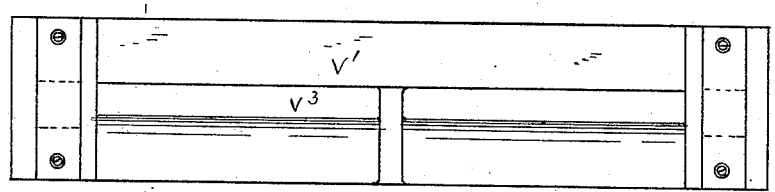
Fig. 16.
Witnesses.
W. H. Cagevin
L. D. Stearns.
Inventor
Albert J. Bates By
Thos. H. Hutchins his atty (No Model.) 7 Sheets—Sheet 6.
A. J. BATES.
ENGINE.
No. 436,768. Patented Sept. 23, 1890.
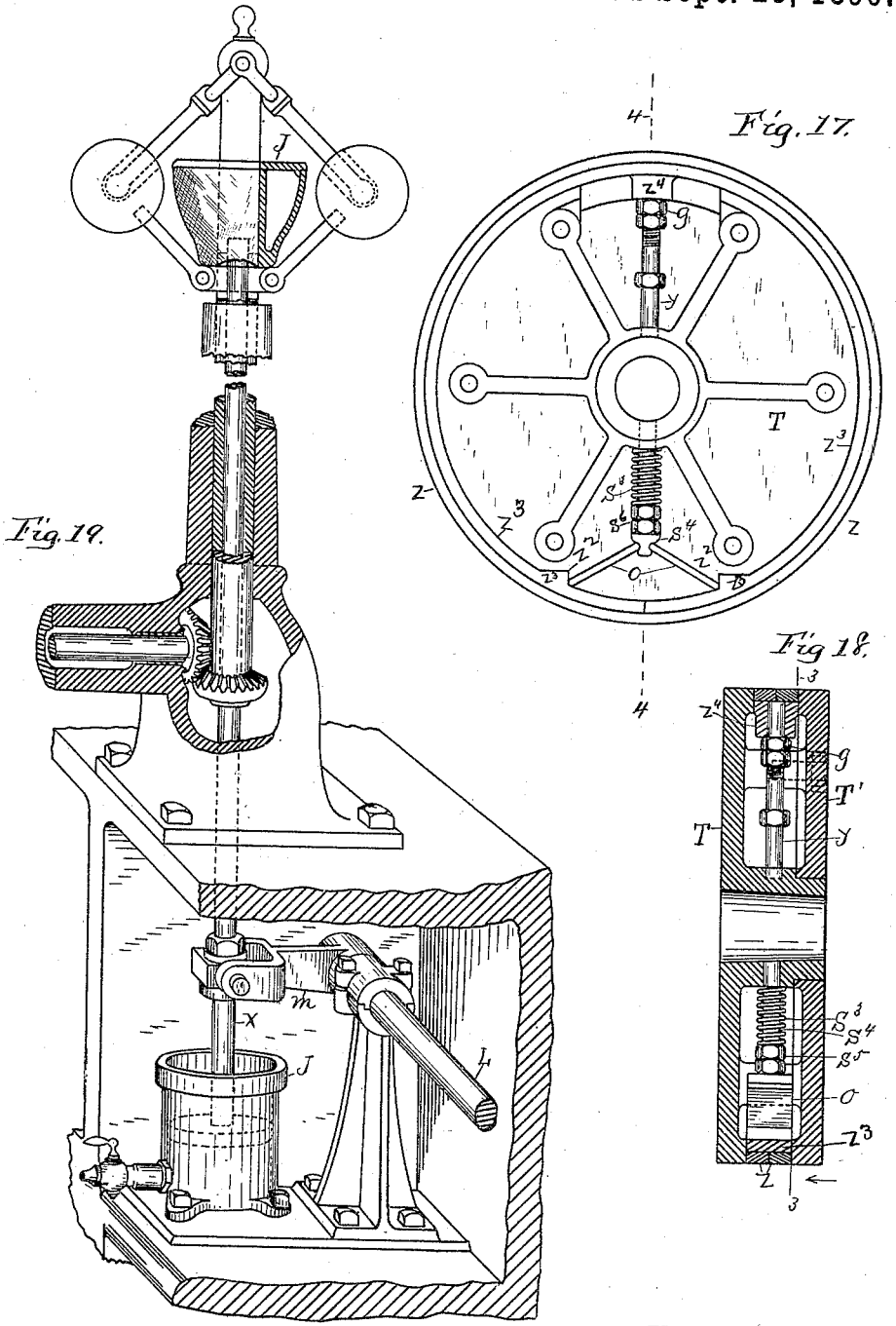

(No Model.) 7 Sheets—Sheet 7.
A. J. BATES.
ENGINE.
No. 436,768. Patented Sept. 23, 1890.
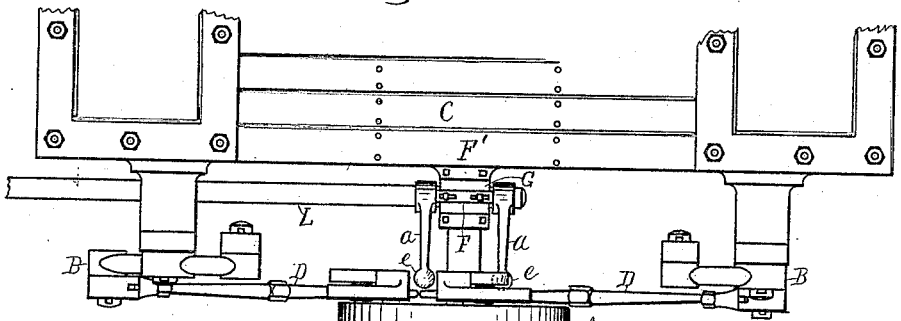
Fig. 20.
Fig. 21.
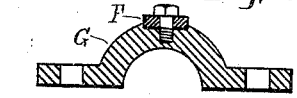
Fig. 22.
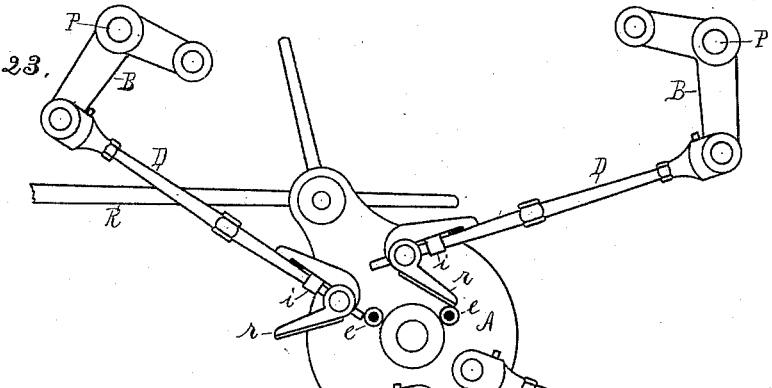
Fig. 23.
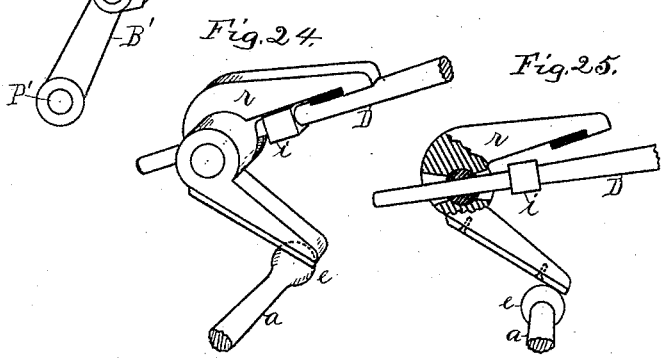
Fig. 24. Fig. 25.
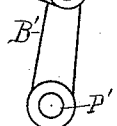
Witnesses,
W. F. Leagwin
L. D. Stear
Inventor
Albert J. Bates By
Thos. H. Hutchins his atty
THE NORRIS PETERS CO., PHOTO-LITHO., WASHINGTON, D. C.

UNITED STATES PATENT OFFICE.

ALBERT J. BATES, OF JOLIET, ILLINOIS.

ENGINE.

SPECIFICATION forming part of Letters Patent No. 436,768, dated September 23, 1890.

Application filed June 16, 1890. Serial No. 355,647. (No model.)

*To all whom it may concern:*

Be it known that I, ALBERT J. BATES, a citizen of the United States of America, residing at Joliet, in the county of Will and State of Illinois, have invented certain new and useful Improvements in Engines, of which the following is a specification, reference being had therein to the accompanying drawings, and the letters and figures of reference thereon, forming a part of this specification, in which—

Figure 1:
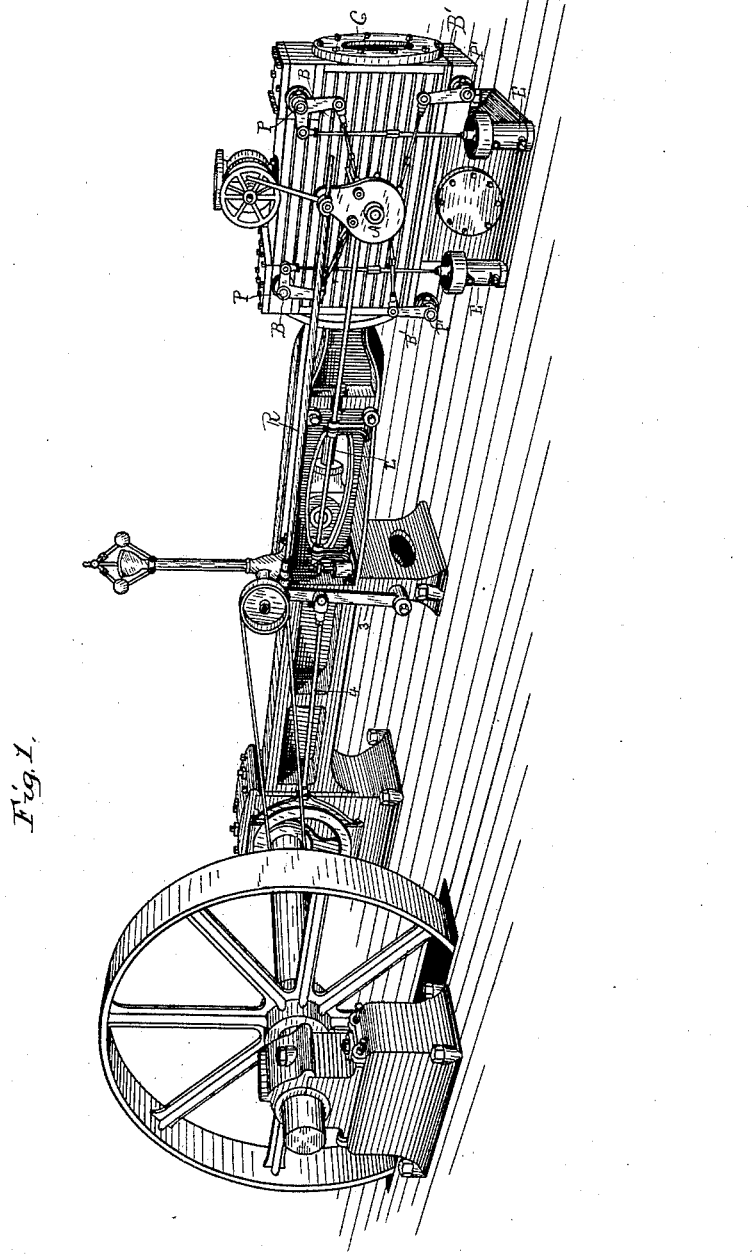
Figure 2:
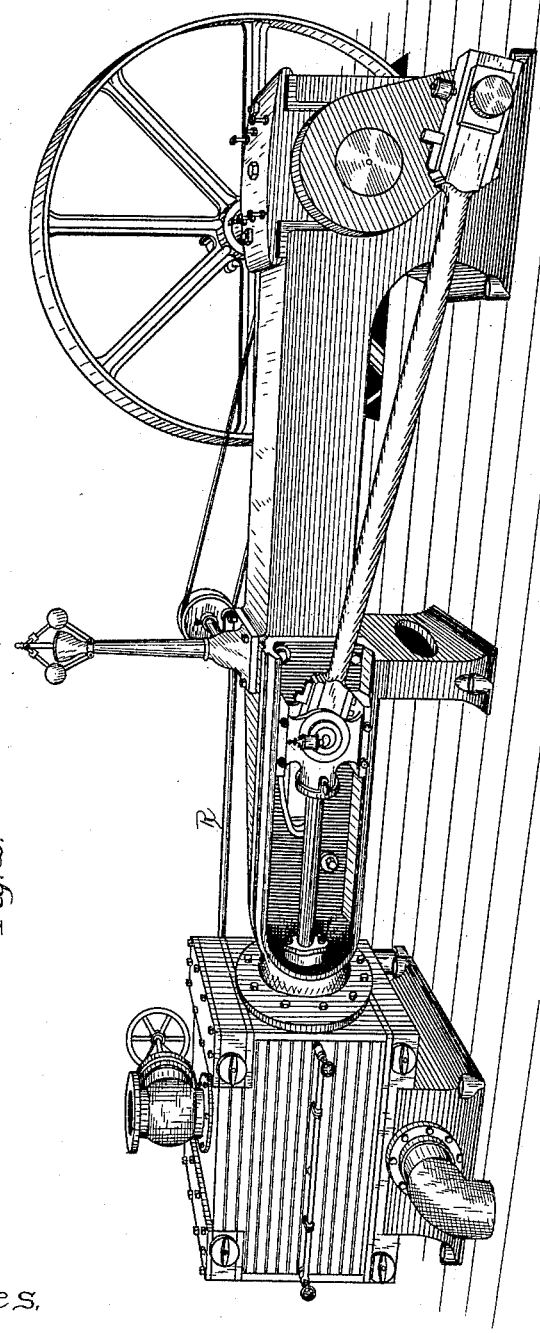
Figure 3:
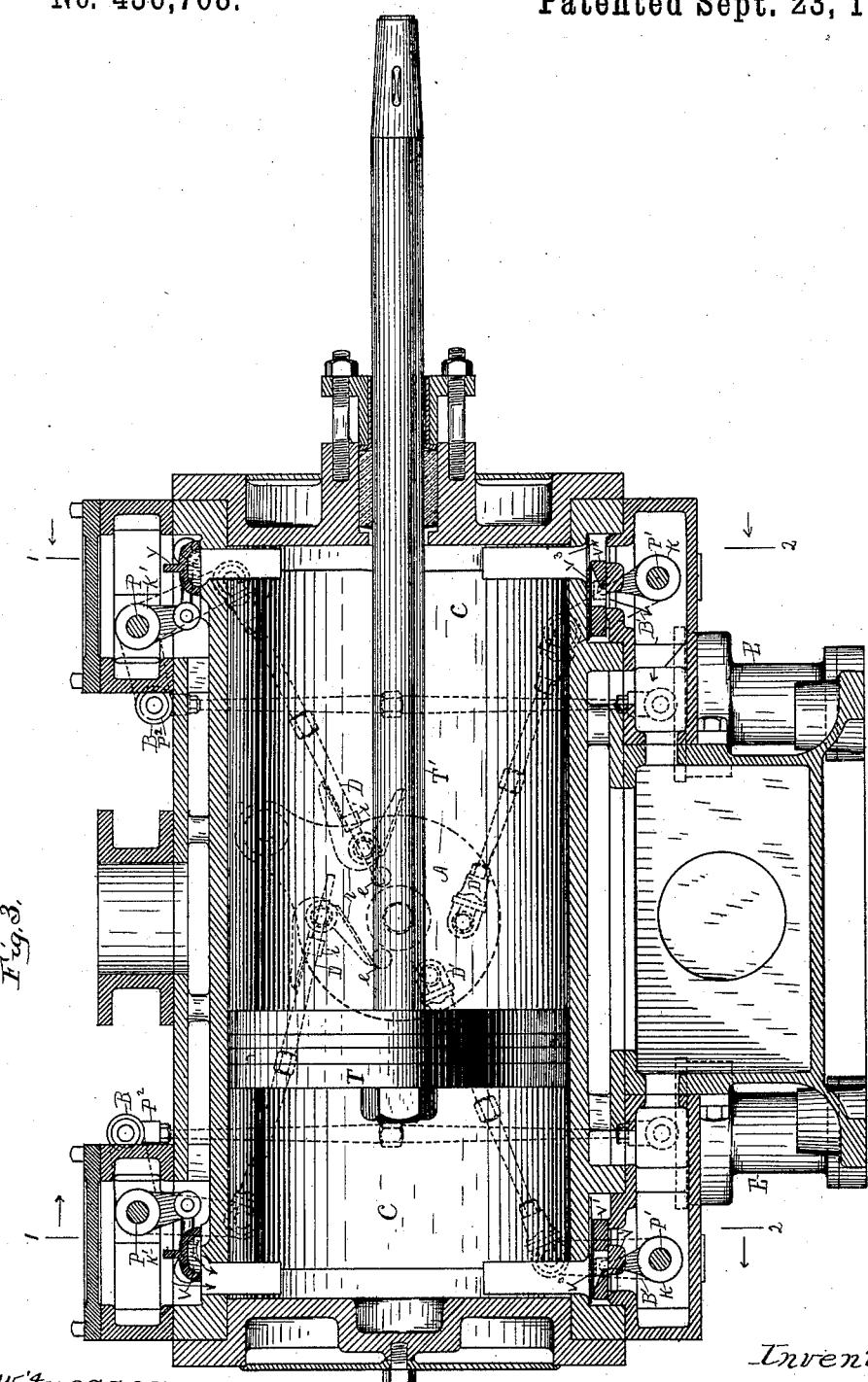

Figures 1 and 2 are perspective views of the engine complete. Fig. 3 is a longitudinal vertical central section of the cylinder and its steam-chests and valves. Fig. 4 is a vertical cross-section of one of the steam-chests of the inlet-valves, taken on line 1 of Fig. 3, looking in the direction of the arrow. Fig. 5 is a top plan view of one of said steam-chests, the top plate being removed so as to show the rock-shaft that moves the valve. Fig. 6 is a top plan view of one of the inlet-valves. Fig. 7 is a central cross-section of said valve. Fig. 8 is a perspective view of one of the cranks of the rock-shaft for moving the inlet-valves. Fig. 9 is a perspective view of one of the links for connecting said crank with said valve. Fig. 10 is a cross-section of Fig. 4, on line 6, looking in the direction of the arrow. Fig. 11 is an end view of Fig. 5, looking at it from the right, showing the stuffing-box and gland. Fig. 12 is a vertical cross-section of one of the receiving-chambers of the exhaust-valves, taken on line 2 of Fig. 3, looking in the direction of the arrow. Fig. 13 is a top plan view of one of the receiving-chambers of the exhaust-valves, taken on line 7 of Fig. 12, looking down. Fig. 14 is a bottom plan view of one of the exhaust-valves and its seat. Fig. 15 is a cross-section of one of the exhaust-valves. Fig. 16 is a perspective view of one of the arms of the rock-shaft of the exhaust-valve. Fig. 17 is a vertical section of the piston, taken on line 3 of Fig. 18, looking in the direction of the arrow. Fig. 18 is a central vertical cross-section of the piston on line 4 of Fig. 17. Fig. 19 is a perspective view of the governor and of its connections with the shaft of the cut-off mechanism. Fig. 20 is a top plan view of a portion of the cylinder and of the oscillating disk pivoted to the side thereof, and of the parts connecting said plate with the valves and governor. Fig. 21 is a perspective view of a plate used in connection with a box of the shaft regulating the cut-off for adjusting said shaft endwise. Fig. 22 is a cross-section of said plate and of the upper part of the box to which it attaches. Fig. 23 is a view of the inner side of said oscillating disk and of the parts connecting it with the valves and governor. Fig. 24 is a perspective view of one of the cut-off hooks of said oscillating disk, of a portion of a rod connecting it with an inlet-valve, and of a portion of one of the arms of the shaft connecting it with the governor, and Fig. 25 is a side view of one of said hooks having a part broken away, showing the inner end of the rod connecting it with the inlet-valve passing through the angle of said hook and through the wrist-pin on which said hook is pivoted.

This invention pertains to certain improvements in steam-engines, and relates more particularly to the mechanism for moving the valves, the mechanism for connecting the governor with the mechanism for moving the valves to regulate the cut-off, in the construction of the piston, and other details that will be fully set forth and explained in the following specification and claims.

Referring to the drawings, A represents an oscillating disk pivoted to one side of the cylinder C. This oscillating disk is provided with four wrist-pins, the two lower ones of which are connected permanently by means of the rods D′ D′ with the cranks B′ B′ of the rock-shafts P′ P′, that move the exhaust-valves V′ V′. The two upper wrist-pins of said plate are detachably connected with the bell-cranks B B of the rock-shafts P P, that move the inlet-valves through the medium of the hooks *r r*. The said hooks *r r* are V-shaped and pivoted, respectively, at about the intersection of their members on the two upper wrist-pins of disk A and are held on said pins by means of the rods D D passing through the angles of said hooks and through said pins in such manner that said rods may reciprocate through said hooks and pins. The aperture through said hooks admitting said rods is formed so that said hooks may oscillate on said pins and so their hooked upper members may overlie said rods D and detachably engage the projection *i* thereon for moving said rods and the inlet-valves. The lower members of said hooks *r r* engage and slide upon the outer extending ends of the arms *a* at *e e*. Said arms *a a* are respectively secured to the rock-shaft L, one on either side of the box E', secured to the cylinder between it and said oscillating disk, which box supports the inner end of said rock-shaft L. The outer or opposite end of said shaft L rests in a suitable box, as shown in Fig. 19, and has attached to it at that end the arm *m*, the outer end of which forks over and pivots to the vertically-reciprocating shaft *x*, having its lower end provided with a piston operating in a dash-pot J to steady its motion. Said crank *m* is intended to be feathered on shaft L and detachably connected thereto by means of a set-screw or other suitable device, for the purpose of permitting said shaft to be adjusted endwise through it for the purpose of adjusting laterally the arms *a a* on the opposite end of said shaft, which arms the hooks *r r* engage, as stated. In order to move said shaft endwise it is necessary to loosen the cap-screws on the top of box F', so that the plate F they adjustably secure to said box in a longitudinal groove may be moved endwise. Said plate fills the space between arms *a a*, so that when the said plate is moved it will move shaft L by means of its contact with said arms, which are secured on said shaft at either side of box F' at a little distance therefrom to permit said end movement. After the said shaft is so moved the said plate is secured by its cap-screws and holds said shaft so adjusted. The said plate A is oscillated by means of an eccentric on the main shaft through the medium of the rods R and 4 and arm 3. When it oscillates, it causes the lower members of the hooks *r r* to alternately engage and slide on the extending ends *e* of arms *a* for the purpose of causing their upper hooked members to disengage from the projections *i* on the rods D, permitting the inlet-valves operated by said rods and hooks to instantly close, which is facilitated by means of vacuum-pots E E connected with the bell-cranks B B, as shown in Figs. 1 and 3. The end adjustment of the shaft L with its arms *a a* is for the purpose of causing said hooks *r r* to release their rods sooner or later, as may be desired.

The movement of the engine is controlled by the governor through the medium of the rock-shaft L and its arms *a a*. As the speed of the governor increases or diminishes, it will elevate or lower the outer ends of arms *a a*, causing them to sooner or later trip the hooks *r r* and release the rods D D, so the inlet-valves may be instantly closed by the vacuum-pots E so that the cut-off becomes automatic in its action and entirely under control of the governor, the effect being that an acceleration of speed makes a diminution of steam inducted, and conversely the object being to secure uniformity of speed. The exhaust-valves V' are held open during the greater part of the stroke of the piston, but the inlet-valves V are opened at the proper time and allowed to shut automatically at some point in the early part of the stroke. The precise point at which this shutting of the inlet-valves occurs depends upon the position of the governor-balls, and the speed of the engine is regulated by the variations in the quantity of steam thus admitted.

Referring to the improvements in the inlet-valves V and their operating parts, P P are rock-shafts connected with the oscillating disk A, as heretofore stated. These rock-shafts have secured to them, respectively, within the steam-chest and near each end the cranks K' K'. The outer ends of these cranks are connected, respectively, with the outer ends of the slide inlet-valves V by means of the links *n*, the said valves being provided at the outer ends with projecting journals W W, upon which said links pivot. By means of such connection said rock-shaft moves said valves on their seats the required distance, controlled by the hooks *r r* and their governor-connections.

The rock-shafts P' P' of the exhaust-valves V' are arranged below the exhaust-valves and are provided with vertical arms K, which extend into recesses in the lower side of the valve near each end. The outer ends of said arms K are pivoted in a sliding box 11, which fits the recess in the valve in such manner that as said valve is moved on its seat said box may have vertical movement in said recess and permit the valve to be reciprocated by the rock-shaft P' and its arms K.

The arched form of the inlet-valves V permits steam to pass under either side from the steam-chest to the cylinder, as shown by the arrows in Fig. 3, the valve-seat being formed as shown in said figure so the steam may so pass under either side of the valve when open. The exhaust-valves V' are provided with a central longitudinal slot $V^3$, as shown in Figs. 3, 14, and 15, for permitting steam to escape both at the side of the valve and through its said slot when the valve is open, which is permitted by the form of its seat, as shown particularly in Fig. 3. The piston-head T has secured to its outer side the follower-plate T' by means of bolts in such manner as to leave an annular chamber between the said piston-head and plate extending radially from a boss of the piston-head to the expansible inner ring $Z^3$, arranged near the periphery of the piston-head between it and said follower-plate.

Z Z are two expansible packing-rings arranged between the piston-head T and said plate T, and inclose ring $Z^3$. It is intended that only these outer packing-rings Z shall be in contact with the cylinder-walls.

Looking at Figs. 17 and 18, Y is a radial rod having its inner end seated in a recess in the boss of the piston-head. Said rod is screw-threaded for a distance on its outer end and provided on its screw-threaded portion with a pair of nuts *g*, the inner one of which is to operate as a lock-nut, and the outer one is to bear against the seat $Z^4$ of the inner packing-ring $Z^3$. Directly opposite said rod Y is arranged another similar radial rod $S^4$, having its inner end passing into the boss of the piston. Its opposite outer end is formed with shoulders for receiving the upper ends of a pair of diverging spread-bars O, upon which rod $S^4$ is seated. The diverging ends of said spread-bars O rest upon the inner packing-ring $Z^3$ against integral lugs $Z^2$ formed thereon. The said rod $S^4$ is screw-threaded and is provided with the nuts $S^6$, one of which is to operate as a lock-nut.

$S^3$ is a coil-spring sleeved on rod $S^4$ between said nuts and the boss of the piston-head. When said nuts are turned up against said spring, its resiliency will cause the spread-bars O to expand the ring $Z^3$, and also the outer rings Z Z. By using the inner ring $Z^3$ on the inner side of the rings Z Z, the steam is less liable to enter between their joints, as it is intended their joints shall not be opposite each other. By turning up the nuts on the rods $S^4$ the packing-rings may be expanded as much as desired, and by the use of the said rod Y, arranged, as shown, in connection with the packing-rings, it is caused to bear the weight of the piston and its rod, and also furnish means to keep the piston-rod in line as the packing-rings wear away. By the use of the coil-spring on rod $S^4$ a yielding pressure is brought to bear against the packing-rings for expanding them as they may wear away. The proper position of the piston when working should be inverted from that shown in Figs. 17 and 18.

The governor-stem X is provided on its upper end with a cup J, for holding some material for weighting said stem, preferably shot, the object in weighting said stem being to control the cut-off. When said stem is heavily weighted, greater speed of the engine will be required to throw the governor-balls outward and operate the cut-off mechanism, and conversely when said cup is weighted less heavily.

Having thus described my invention, what I claim as new, and desire to secure by Letters Patent, is as follows, to wit:

1. The combination, with the cylinder C and its valves, of the oscillating disk A, having the wrist-pins, cranks B B′, rods D D′, hooks r, oscillating shaft L, having the arms a a and m, rod R, and governor-stem X, all arranged to operate substantially as and for the purpose set forth.

2. In the engine shown and described, the combination of the oscillating disk A, having wrist-pins for connecting it with the inlet-valves, hooks r, journaled on said wrist-pins, rods D, having the projections i, and having their outer ends adapted to pass through and reciprocate in said pins and the angle of said hooks, and the oscillating shaft L, having the arms a, substantially as and for the purpose set forth.

3. In the engine shown and described, the combination, with the oscillating disk A, having wrist-pins on its face for moving the inlet-valves, the hooks r, journaled on said pins, and the rods D, having their outer ends adapted to pass through said wrist-pins and said hooks and reciprocate therein, substantially as and for the purpose set forth.

4. In the engine shown and described, the combination, with the oscillating disk A, of hooks r, rock-shaft L, having arms a adapted to alternately be engaged by said hooks and adapted to be laterally adjusted, substantially as and for the purpose set forth.

5. In the engine shown and described, the combination of the rock-shaft L and the arms a for engaging the hooks r, said shaft being adapted to be moved and adjusted endwise, substantially as and for the purpose set forth.

6. In the engine shown and described, the combination of the rock-shaft L, having arms a a m, governor-stem X, box F′, adjustable slide F, and hooks r, substantially as and for the purpose set forth.

7. In the engine shown and described, the combination of rock-shaft L, having the arms a a m and adapted to have end adjustment, governor-stem X, pot J, oscillating disk A, having the wrist-pins shown, eccentric-rod R, hooks r, rods D, having projections i, crank B, connected with vacuum-pots E, rock-shafts P, having arms K′, links n, valves V, rods D′, cranks B′, rock-shafts P′, having arms K, sliding boxes H, and valves V′, all arranged to operate substantially as and for the purpose set forth.

8. In the engine shown and described and in combination with the oscillating disk carrying rods for operating the valves, the hooks for alternately operating the rods connected with the inlet-valves, and the arms a a, adapted to be laterally adjusted and adapted to be oscillated, substantially as and for the purpose set forth.

9. In the engine shown and described, in combination with the cylinder C and inlet steam-chests, the sliding inlet-valves V, rock-shafts P, having the arms K, and links n, substantially as and for the purpose set forth.

10. In the engine shown and described, in combination with the cylinder C and exhaust-steam chests, the sliding exhaust-valves V′, rock-shafts P′, arms K, and sliding box H, substantially as and for the purpose set forth.

11. In the engine shown and described, in combination with the cylinder C and exhaust-steam chests, the sliding exhaust-valves V′, rock-shafts P′, arms K′, sliding boxes H, and the means shown and described for operating said valves, substantially as and for the purpose set forth.

12. In the engine shown and described, the combination of the oscillating disk A, hooks $r$, oscillating arms $a$, rods D, having the projections $i$, bell-cranks B, vacuum-pots E, rods $P^2$, rock-shafts P, having arms K′, links $n$, and slide-valves V, substantially as and for the purpose set forth.

13. In the engine shown and described, the combination of the oscillating disk A, rods D′, cranks B′, rock-shafts P′, having the crank-arms K, sliding boxes H, and exhaust-valves V′, provided with the recesses for the reception of said sliding boxes H, substantially as and for the purpose set forth.

ALBERT J. BATES.

Witnesses:
THOS. H. HUTCHINS,
W. O. BATES.